United States Patent
Lin

(10) Patent No.: US 11,223,463 B2
(45) Date of Patent: Jan. 11, 2022

(54) WIRELESS COMMUNICATIONS METHOD AND COMMUNICATIONS DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/987,244

(22) Filed: Aug. 6, 2020

(65) Prior Publication Data

US 2020/0366447 A1 Nov. 19, 2020

Related U.S. Application Data

(63) Continuation of application No. PCT/CN2018/103084, filed on Aug. 29, 2018.

(51) Int. Cl.
- *H04B 3/46* (2015.01)
- *H04L 5/00* (2006.01)
- *H04W 72/04* (2009.01)

(52) U.S. Cl.
CPC ....... *H04L 5/0055* (2013.01); *H04W 72/0446* (2013.01)

(58) Field of Classification Search
USPC ........................................................ 375/222
See application file for complete search history.

(56) References Cited

U.S. PATENT DOCUMENTS

| | | | |
|---|---|---|---|
| 10,039,128 B2 * | 7/2018 | Bennett | H04W 72/0446 |
| 2009/0067391 A1 * | 3/2009 | Shen | H04L 5/0053 370/336 |
| 2013/0258978 A1 * | 10/2013 | Aiba | H03M 13/6356 370/329 |
| 2016/0182209 A1 * | 6/2016 | Li | H04L 5/1469 370/329 |
| 2016/0192376 A1 * | 6/2016 | Lee | H04W 72/0406 370/252 |

(Continued)

FOREIGN PATENT DOCUMENTS

| | | |
|---|---|---|
| CN | 108289011 A | 7/2018 |
| CN | 108347311 A | 7/2018 |

(Continued)

OTHER PUBLICATIONS

International Search Report dated May 30, 2019 of PCT/CN2018/103084 (4 pages).

(Continued)

*Primary Examiner* — Helene E Tayong
(74) *Attorney, Agent, or Firm* — Perkins Coie LLP

(57) ABSTRACT

Provided in the implementations of the present disclosure are a wireless communication method and communication device. The method includes: determining a second time unit according to a time domain position of at least one first time unit in a plurality of first time units used for transmitting data; and transmitting feedback information by using the second time unit, wherein the feedback information is feedback information aiming at the data transmitted on the plurality of first time units.

14 Claims, 3 Drawing Sheets

(56) References Cited

U.S. PATENT DOCUMENTS

| | | | |
|---|---|---|---|
| 2016/0226643 A1 | 8/2016 | Mallik et al. | |
| 2018/0077719 A1* | 3/2018 | Nory | H04W 28/0278 |
| 2018/0368163 A1* | 12/2018 | Feng | H04W 24/02 |
| 2019/0123878 A1* | 4/2019 | Gao | H04W 72/0453 |
| 2019/0363840 A1* | 11/2019 | Wang | H04L 1/1861 |
| 2020/0067574 A1* | 2/2020 | Yang | H04W 72/1289 |

FOREIGN PATENT DOCUMENTS

| | | |
|---|---|---|
| JP | 2016503611 A | 2/2016 |
| RU | 2015155897 A | 11/2016 |
| WO | 2018027589 A1 | 2/2018 |
| WO | 2018027818 A1 | 2/2018 |
| WO | 2018029634 A1 | 2/2018 |
| WO | 2018144560 A1 | 8/2018 |

OTHER PUBLICATIONS

3GPP TS 38.213 V15.0.0 (Dec. 2017)—3rd Generation Partnership Project; Technical Specification Group Radio Access Network; NR; Physical layer procedures for control (Release 15) (56 pages).

3GPP TS 38.214 V15.0.0 (Dec. 2017)—3rd Generation Partnership Project; Technical Specification Group Radio Access Network; NR; Physical layer procedures for data (Release 15) (71 pages).

CIPO, First Office Action for Canadian Patent Application No. 3089915, dated Jan. 20, 2021. 4 pages.

EPO, Extended European Search Report for European Patent Application No. 18931968.4, dated Jan. 25, 2021. 7 pages.

IPA, Examination Report No. 1 for Australian Patent Application No. 2018439800, dated Jan. 20, 2021. 4 pages.

IPA, Examination Report No. 2 for Australian Patent Application No. 2018439800, dated Apr. 8, 2021. 3 pages.

Samsung "Discussion on scheduling of multiple TBs for MTC" 3GPP Draft; R1-1808732; Aug. 11, 2018.

IPI, Examination Report for Indian Patent Application No. 202027041741, dated Aug. 20, 2021. 5 pages.

MediaTek Inc. "On eMBB/URLLC DL Multiplexing Indication" R1-1704474; 3GPP TSG RAN WG1 Meeting #88bis; Apr. 3-7, 2017. 5 pages.

RosPatent, First Office Action for Russian Patent Application No. 2020127799, dated Jul. 5, 2021. 12 pages with English translation.

CIPO, Second Examiner's Report for Canadian Patent Application No. 3089915, dated Oct. 12, 2021. 4 pages.

EPO, Examination Report for European Application No. 18931968.4, dated Oct. 7, 2021. 5 pages.

Ericcson "On Scheduling and UCI Handling in Carrier Aggregation" R1-1711517; 3GPP TSG RAN WG1 NR Ad-Hoc#2; Jun. 27-30, 2017. 4 pages.

JPO, Notification of Refusals for Refusal for Japanese Application No. 2020-546492, dated Oct. 5, 2021. 6 pages with English translation.

* cited by examiner

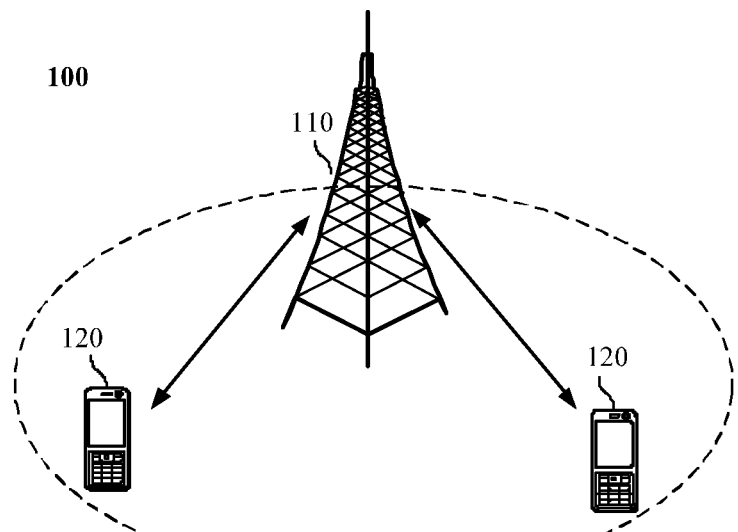
FIG. 1
200
| 210 A communications device determines a second time unit according to a time domain location of at least one of first time units used to transmit data |
| 220 The communications device transmits feedback information by using the second time unit, where the feedback information is feedback information for the data transmitted in the first time units |
FIG. 2
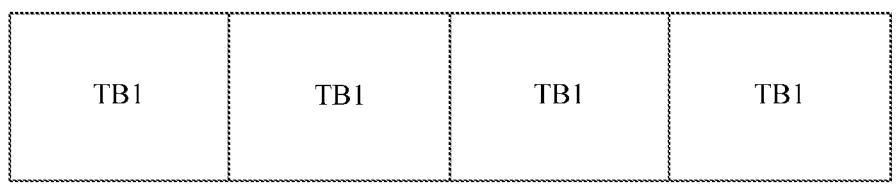
FIG. 3

WIRELESS COMMUNICATIONS METHOD AND COMMUNICATIONS DEVICE

CROSS-REFERENCE TO RELATED APPLICATION

This application is a continuation application of International Application No. PCT/CN2018/103084 filed on Aug. 29, 2018, the entire content of which is hereby incorporated by reference.

BACKGROUND

Technical Field

The present disclosure relates to the field of communications, and specifically, to a wireless communications method and a communications device.

Related Art

In a 5G system, slot aggregation is introduced, that is, one time of scheduling or one transport block may occupy a plurality of slots.

For data transmitted in a plurality of slots in slot aggregation, how to perform feedback is a problem to be resolved urgently.

SUMMARY

Implementations of the present disclosure provide a wireless communications method and a communications device.

According to a first aspect, a wireless communications method is provided, including: determining a second time unit according to a time domain location of at least one of first time units used to transmit data; and transmitting feedback information by using the second time unit, where the feedback information is feedback information for the data transmitted in the first time units.

According to a second aspect, a communications device is provided, configured to perform the method according to the first aspect.

Specifically, the device includes functional modules configured to perform the method according to the first aspect.

According to a third aspect, a communications device is provided, including a processor and a memory. The memory is configured to store a computer program, and the processor is configured to invoke and run the computer program stored in the memory, to perform the method according to the first aspect.

According to a fourth aspect, a chip is provided, configured to perform the method according to the first aspect.

Specifically, the chip includes: a processor, configured to invoke a computer program from a memory and run the computer program, to cause a device in which the chip is installed to perform the method according to the first aspect.

According to a fifth aspect, a computer-readable storage medium is provided, configured to store a computer program. The computer program causes a computer to perform the method according to the first aspect.

According to a sixth aspect, a computer program product is provided, including a computer program instruction, where the computer program instruction causes a computer to perform the method according to the first aspect.

According to a seventh aspect, a computer program is provided. When run on a computer, the computer program causes the computer to perform the method according to the first aspect.

BRIEF DESCRIPTION OF THE DRAWINGS

FIG. 1 is a schematic diagram of an infrastructure of a communications system according to an implementation of the present disclosure.

FIG. 2 is a schematic diagram of a wireless communications method according to an implementation of the present disclosure.

FIG. 3 is a schematic diagram of TB transmission according to an implementation of the present disclosure.

DETAILED DESCRIPTION

Figure 4:
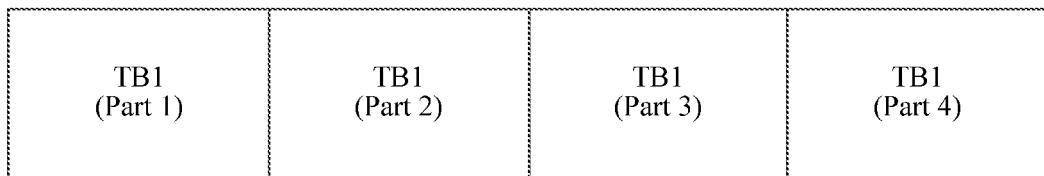
FIG. 4 is a schematic diagram of TB transmission according to an implementation of the present disclosure.

The technical solutions of the implementations of the present disclosure will be described in the following with reference to the accompanying drawings. It is obvious that the implementations to be described are a part rather than all of the implementations of the present disclosure. All other implementations obtained by a person of ordinary skill in the art based on the implementations of the present disclosure without creative efforts shall fall within the protection scope of the present disclosure.

The technical solutions in the implementations of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or a 5G system.

Exemplarily, FIG. 1 shows a communications system 100 to which an implementation of the present disclosure is applied. The communications system 100 may include a network device 110, and the network device 110 may be a device communicating with a terminal device 120 (or be referred to as a communications terminal or a terminal). The network device 110 may provide communication coverage for a particular geographical area, and may communicate with a terminal device that is located in the coverage. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, a network device in a future evolved public land mobile network (PLMN) or the like.

The communications system 100 further includes at least one terminal device 120 located within the coverage range of the network device 110. The "terminal device" used herein includes, but is not limited to an apparatus configured to receive/send a communication signal through a wired circuit connection, for example, through a public switched telephone network (PSTN), a digital subscriber line (DSL), a digital cable, or a direct cable connection; and/or another data connection/network; and/or through a wireless interface, for example, for a cellular network, a wireless local area network (WLAN), a digital television network such as a DVB-H network, a satellite network, or an AM-FM broadcast transmitter; and/or another terminal device; and/or an Internet of Things (IoT) device. The terminal device configured to communicate through a wireless interface may be referred to as a "wireless communications terminal", a "wireless terminal", or a "mobile terminal". An example of the mobile terminal includes, but is not limited to a satellite or cellular phone; a personal communications system (PCS) terminal capable of combining a cellular radio phone, and data processing, faxing, and data communication capabilities; a personal digital assistant (PDA) capable of including a radio phone, a pager, Internet/Intranet access, a Web browser, an organizer, a calendar, and/or a Global Positioning System (GPS) receiver; and a conventional laptop and/or palmtop receiver, or another electronic apparatus including a radio phone transceiver. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a 5G network, a terminal device in a future evolved PLMN, or the like.

Optionally, the terminal devices 120 may perform device to device (D2D) communication with each other.

Optionally, the 5G system or 5G network may be further referred to as a new radio (NR) system or NR network.

FIG. 2 is a schematic flowchart of a wireless communications method 200 according to an implementation of the present disclosure. The method is performed by a communications device, and the communications device may be a terminal device, or a network device.

In 210, the communications device determines a second time unit according to a time domain location of at least one of first time units used to transmit data.

Optionally, in this implementation of the present disclosure, the data may be uplink data. The uplink data may be carried in a physical uplink shared channel (PUSCH), and may be scheduled by semi-persistent scheduling (SPS) or be dynamically scheduled through downlink control information (DCI).

In this case, the terminal device may send the uplink data through first time units, and receive, in a second time unit, feedback information for the uplink data. Alternatively, the network device may receive the uplink data through first time units, and send, in a second time unit, feedback information for the uplink data.

Optionally, in this implementation of the present disclosure, the data may be downlink data. The downlink data may be carried in a physical downlink shared channel (PDSCH), and may be scheduled by SPS, or be dynamically scheduled through DCI.

In this case, the terminal device may receive the downlink data through first time units, and send, in a second time unit, feedback information for the downlink data. Alternatively, the network device may send the downlink data through first time units, and receive, in a second time unit, feedback information for the downlink data.

Optionally, in this implementation of the present disclosure, the first time unit is a symbol, a slot, a sub-slot, a half-slot, or a subframe.

A quantity of symbols of the half-slot mentioned in this implementation of the present disclosure may be equal to half of a quantity of symbols included in the slot, and a slot may include two half-slots.

The sub-slot mentioned in this implementation of the present disclosure may include at least one symbol, and a slot may be divided into at least one sub-slot.

Optionally, first time units occupied by data may have same granularity (for example, occupying two slots), or may not have same granularity (for example, occupying two slots plus two symbols). The granularity may be represented by the quantity of included symbols, and may be classified as a symbol, a slot, a sub-slot, a half-slot, or a subframe.

Optionally, the first time units are a plurality of consecutive first time units. For example, as shown in FIG. 3 or FIG. 4, a plurality of consecutive slots are occupied.

Certainly, in this implementation of the present disclosure, the first time units for transmitting the data may alternatively be inconsecutive.

For example, in the first time units for transmitting the data, there is at least one time unit between two adjacent first time units.

For another example, in the first time units for transmitting the data, there are a same quantity of time units between every two adjacent first time units.

Optionally, in this implementation of the present disclosure, a quantity of the first time units used to transmit the data may be preset in the terminal device, or be configured for the terminal device by a network side through higher-layer signaling or physical-layer signaling.

Optionally, in this implementation of the present disclosure, the second time unit is a symbol, a slot, a sub-slot, a half-slot, or a subframe.

Optionally, in this implementation of the present disclosure, granularity of the first time unit is the same as granularity of the second time unit.

For example, both the first time unit and the second time unit are slots, or half-slots.

Optionally, in this implementation of the present disclosure, the granularity of the first time unit is different from the granularity of the second time unit.

Optionally, in this implementation of the present disclosure, the communications device may determine the second time unit according to a time domain location of the last one of the first time units.

By determining, based on a time domain location of the last first time unit, a second time unit used to transmit feedback information, a more suitable second time unit for transmitting the feedback information may be determined, which prevents the quantity of the first time units from affecting transmission of the feedback information. For example, assuming that the quantity of the first time units for transmitting the data is changeable, and a quantity of time units between the last first time unit and a determined second time unit is fixed, and assuming that the second time unit for transmitting the feedback information is determined by using a time domain location of a $1^{st}$ first time unit, if the quantity of the first time units is excessively large, the determined second time unit is excessively close to the last first time unit (even ahead of the last first time unit), so that there is no sufficient time to transmit the feedback information. Alternatively, if the quantity of the first time units is excessively small, there are excessive time units between the determined second time unit and the last first time unit. As a result, before the feedback information is sent or received, waiting for a relatively long time is required.

However, it should be understood that, this implementation of the present disclosure is not limited to determining the second time unit by necessarily using the time domain location of the last first time unit. For example, a penultimate first time unit may be used to determine the first time unit, or a $1^{st}$ first time unit may be used to determine the second time unit (in this case, the quantity of the first time units may be dynamically adjusted, and the quantity of time units between the first time unit and the second time unit may be dynamically adjusted; or the quantity of the first time units may be fixed, and the quantity of time units between the first time unit and the second time unit may be fixed).

Optionally, in this implementation of the present disclosure, when the granularity of the first time unit is different from the granularity of the second time unit, the second time unit is determined according to a time domain location of a second time unit to which the at least one first time unit belongs.

The second time unit used to transmit the feedback information is an $(n+k)^{th}$ second time unit, and an $n^{th}$ second time unit is a second time unit to which the last one of the first time units belongs. In this case, a subcarrier spacing corresponding to the first time unit and a subcarrier spacing corresponding to the second time unit may be the same, and k and n are nonnegative integers.

For example, assuming that the data is transmitted in a first half-slot, a second half-slot, a third half-slot, and a fourth half-slot, the fourth half-slot belongs to the second slot, and k is four slots, the second time unit used to transmit the feedback information is a sixth slot.

Optionally, in this implementation of the present disclosure, when the granularity of the first time unit is the same as the granularity of the second time unit, the second time unit used to transmit the feedback information is an $(n+k)^{th}$ second time unit, and an $n^{th}$ second time unit is the last one of the first time units. In this case, a subcarrier spacing corresponding to the first time unit and a subcarrier spacing corresponding to the second time unit may be the same, and k and n are nonnegative integers.

Assuming that the data is transmitted in a first slot, a second slot, a third slot, and a fourth slot, and k is four slots, the second time unit used to transmit the feedback information is an eighth slot.

It should be understood that, descriptions are made by using an example of determining the second time unit by using the time domain location of the last one of the first time units. However, the foregoing example is still applicable to another first time unit as long as replacing the last first time unit in the foregoing example with the another first time unit.

Optionally, in this implementation of the present disclosure, the subcarrier spacing of the first time unit and the subcarrier spacing of the second time unit may be the same, or may be different.

The communications device may determine the second time unit according to the time domain location of the at least one first time unit, a subcarrier spacing of the first time unit, and a subcarrier spacing of the second time unit.

How to determine the second time unit by combining the subcarrier spacing and the granularity of the time unit is described below by using an example in which the second time unit is determined by using the time domain location of the last first time unit.

Optionally, in this implementation of the present disclosure, the second time unit used to transmit the feedback information may be $((n+k)2^a/2^b)$, where units of subcarrier spacings of k and n are kept consistent, both k and n are positive integers, a represents the subcarrier spacing of the second time unit, and b represents the subcarrier spacing of the first time unit. When the granularity of the first time unit is the same as the granularity of the second time unit, n is a time domain location of one (for example, the last first time unit) of the first time units; and when the granularity of the first time unit is different from the granularity of the second time unit, n is a time domain location of a second time unit to which one (for example, the last first time unit) of the first time units belongs.

It should be understood that, in addition to determining the second time unit according to the formula $((n+k)2^a/2^b)$, the second time unit may be further determined according to another manner. This is not specifically limited in this implementation of the present disclosure.

Optionally, in this implementation of the present disclosure, the method is performed by a terminal device, k (which may include k anywhere) is preset in the terminal device based on a protocol, or configured for the terminal device through a higher-layer parameter (which may be carried in the higher-layer signaling) of a network side, or indicated to the terminal device by a network side through physical-layer signaling, for example, downlink control information (DCI).

Optionally, in this implementation of the present disclosure, the method is performed by a network device, and the network device configures k for the terminal device through a higher-layer parameter; or the network device indicates k to the terminal device through DCI.

Optionally, the network device may indicate k by using a manner of combining the higher-layer signaling and the physical-layer signaling.

For example, when the terminal device has not received a set of k of radio resource control (RRC) signaling, the physical-layer signaling indicates a value from a pre-defined set, for example, {1, 2, 3, 4, 5, 6, 7, 8}. When the set of k configured by the RRC signaling is received, the physical-layer signaling indicates a value from a set configured by the higher-layer signaling.

In 220, the communications device transmits (receives or sends) feedback information by using the second time unit, where the feedback information is feedback information for the data transmitted in the first time units.

In an implementation, the first time units are used to transmit a transport block (TB) repeatedly for a plurality of times. Redundancy versions (RV) used for a plurality of times of repeated transmission may be the same, or may be different. Original information bits of a plurality of times of repeated transmission are the same. For example, as shown in FIG. 3, a TB 1 is transmitted for four times.

The feedback information includes an acknowledgement (ACK)/negative acknowledgement (NACK), where the ACK/NACK corresponds to a TB transmitted for a plurality of times. An ACK/NACK means that the ACK is sent or the NACK is sent.

Specifically, as long as the terminal device has received a TB transmitted once, the terminal device may send the ACK; and if each TB transmitted once is not received, the terminal device may send the NACK. Alternatively, if the terminal device has not received a TB transmitted once, the terminal device may send the NACK; and if each TB transmitted for all times is received, the terminal device feeds back the ACK.

Alternatively, the feedback information includes a plurality of ACKs/NACKs, and the plurality of ACKs/NACKs correspond one-to-one with a plurality of code block groups (CBG) included in the TB.

Specifically, for a CBG, as long as the CBG is received in a TB transmitted once, the ACK may be sent for the CBG; and if the CBG is received in no TB transmitted once, the NACK may be sent for the CBG. Alternatively, for a CBG, as long as the CBG is not received in a TB transmitted once, the NACK may be sent for the CBG; and if the CBG is received in any TB transmitted once, the NACK may be sent for the CBG.

In an implementation, the first time units are used to transmit a plurality of parts of a transport block (TB), and each part of the plurality of parts occupies a first time unit. Original information bits of the plurality of parts are different. For example, as shown in FIG. 4, a TB 1 is divided into four parts respectively transmitted in four first times.

Division of parts of the TB may be the same as division of CBGs included in the TB, for example, each part includes a CBG. Alternatively, the division of the parts of the TB may be different from the division of the included CBGs, for example, a part may include a plurality of CBGs or less than one CBG. The TB may be divided into a plurality of parts averagely, or may be divided into a plurality of parts according to a non-average manner.

The feedback information includes one ACK/NACK, and the ACK/NACK corresponds to the TB.

Specifically, if the plurality of parts are all received successfully, the ACK may be fed back; and if there is at least one part that is not received successfully, the NACK is fed back.

Alternatively, the feedback information includes a plurality of ACKs/NACKs, and the plurality of ACKs/NACKs correspond one-to-one with a plurality of CBGs included in the TB.

For example, for a CBG, if the CBG is received successfully, the ACK may be fed back; and if the CBG is not received successfully, the NACK may be fed back.

Alternatively, the feedback information includes a plurality of ACKs/NACKs, and the plurality of ACKs/NACKs correspond one-to-one with the plurality of parts included in the TB.

For example, for a part, if the part is received successfully, the ACK may be fed back; and if the part is not received successfully, the NACK may be fed back.

It should be understood that, in this implementation of the present disclosure, in addition to sending the feedback information of the data transmitted in the first time units, the second time unit may further transmit feedback information of data of another time unit. For example, if another TB calculated according to the foregoing manner is transmitted by using a different k, feedback information of the another TB may also need to be transmitted in the second time unit.

Therefore, in this implementation of the present disclosure, a second time unit is determined according to a time domain location of at least one of first time units used to transmit data; and feedback information is transmitted by using the second time unit, where the feedback information is feedback information for the data transmitted in the first time units, which may implement feedback for data of a plurality of time units (for example, slots).

Figure 5:
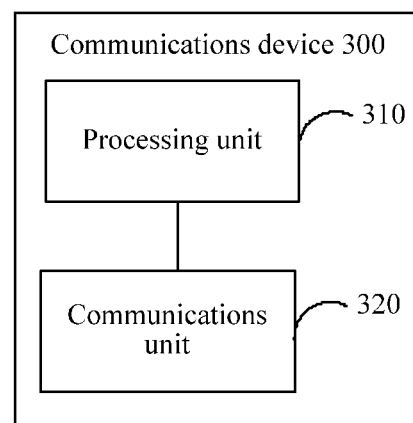
FIG. 5 is a schematic block diagram of a communications device according to an implementation of the present disclosure.

FIG. 5 is a schematic block diagram of a communications device 300 according to an implementation of the present disclosure. As shown in FIG. 5, the communications device 300 includes a processing unit 310 and a communications unit 320, where the processing unit 310 is configured to: determine a second time unit according to a time domain location of at least one of first time units used to transmit data; and the communications unit 320 is configured to: transmit feedback information by using the second time unit, where the feedback information is feedback information for the data transmitted in the first time units.

Optionally, the processing unit 310 is further configured to:

determine the second time unit according to a time domain location of the last one of the first time units.

Optionally, the first time units are used to transmit a transport block (TB) repeatedly for a plurality of times.

Optionally, the feedback information includes an ACK/NACK, and the ACK/NACK corresponds to the TB transmitted repeatedly for a plurality of times; or the feedback information includes a plurality of ACKs/NACKs, and the plurality of ACKs/NACKs correspond one-to-one with a plurality of CBGs included in the TB.

Optionally, the first time units are used to transmit a plurality of parts of a transport block (TB), and each part of the plurality of parts occupies a first time unit.

Optionally, the feedback information includes an ACK/NACK, and the ACK/NACK corresponds to the TB;

the feedback information includes a plurality of ACKs/NACKs, and the plurality of ACKs/NACKs correspond one-to-one with a plurality of CBGs included in the TB; or the feedback information includes a plurality of ACKs/NACKs, and the plurality of ACKs/NACKs correspond one-to-one with the plurality of parts included in the TB.

Optionally, the first time unit is a symbol, a slot, a sub-slot, a half-slot, or a subframe.

Optionally, the second time unit is a symbol, a slot, a sub-slot, a half-slot, or a subframe.

Optionally, granularity of the first time unit is the same as granularity of the second time unit; or the granularity of the first time unit is different from the granularity of the second time unit.

Optionally, when the granularity of the first time unit is different from the granularity of the second time unit, the processing unit 320 is further configured to: determine the second time unit according to a time domain location of a second time unit to which the at least one first time unit belongs.

Optionally, the second time unit used to transmit the feedback information is an $(n+k)^{th}$ second time unit, and an $n^{th}$ second time unit is a second time unit to which the last one of the first time units belongs.

Optionally, when the granularity of the first time unit is the same as the granularity of the second time unit, the second time unit used to transmit the feedback information is an $(n+k)^{th}$ second time unit, and an $n^{th}$ second time unit is the last one of the first time units.

Optionally, the communications device is performed by a terminal device, and k is preset in the terminal device based on a protocol, or configured for the terminal device through a higher-layer parameter of a network side, or indicated to the terminal device by a network side through downlink control information (DCI).

Optionally, the communications device is performed by a network device, and the communications unit 320 is further configured to:

configure k for the terminal device through a higher-layer parameter; or indicate k to the terminal device through DCI.

Optionally, the processing unit 310 is further configured to:

determine the second time unit according to the time domain location of the at least one first time unit, a subcarrier spacing of the first time unit, and a subcarrier spacing of the second time unit.

Optionally, the first time units are a plurality of consecutive first time units.

Optionally, the data is uplink data; or the data is downlink data.

It should be understood that, the communications device may correspond to the terminal device in the method 200, and may implement corresponding operations of the terminal device in the method 200. For brevity, details are not described herein again.

Figure 6:
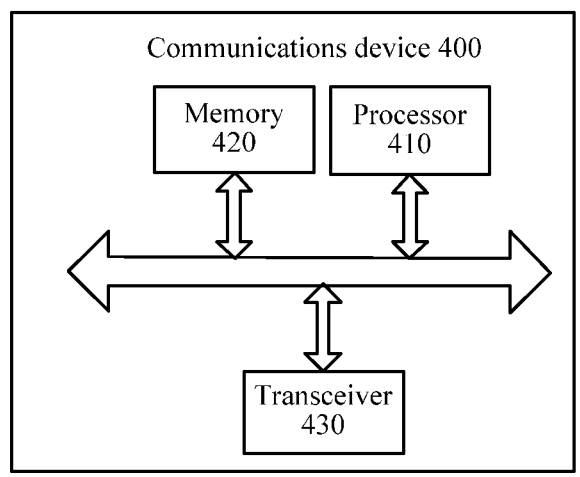
FIG. 6 is a schematic block diagram of a communications device according to an implementation of the present disclosure.

FIG. 6 is a schematic structural diagram of a communications device 400 according to an implementation of the present disclosure. The communications device 400 shown in FIG. 4 includes a processor 410. The processor 410 may invoke a computer program from a memory and run the computer program, to implement the method in the implementations of the present disclosure.

Optionally, as shown in FIG. 6, the communications device 400 may further include a memory 420. The processor 410 may invoke the computer program from the memory 420 and run the computer program, to implement the method in the implementations of the present disclosure.

The memory 420 may be an individual component independent of the processor 410, or may be integrated into the processor 410.

Optionally, as shown in FIG. 6, the communications device 400 may further include a transceiver 430. The processor 410 may control the transceiver 430 to communicate with another device, and specifically, may send information or data to another device, or receive information or data sent by another device.

The transceiver 430 may include a transmitter and a receiver. The transceiver 430 may further include one or more antennas.

Optionally, the communications device 400 may be specifically a first communications device in the implementations of the present disclosure, and the communications device 400 can implement corresponding procedures implemented by the first device in various methods in the implementations of the present disclosure. For brevity, details are not described herein again.

Optionally, the communications device 400 may be specifically a second communications device in the implementations of the present disclosure, and the communications device 400 can implement corresponding procedures implemented by the second device in various methods in the implementations of the present disclosure. For brevity, details are not described herein again.

Figure 7:
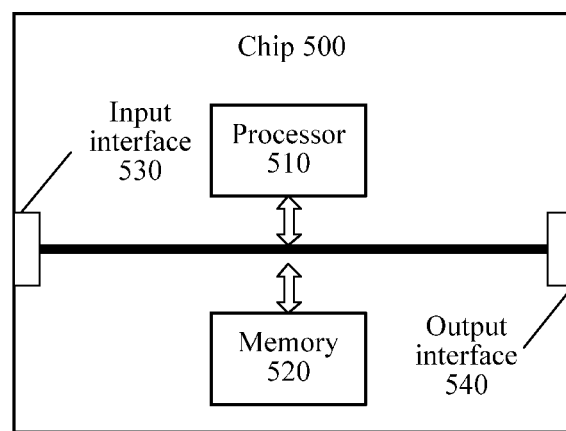
FIG. 7 is a schematic block diagram of a chip according to an implementation of the present disclosure.

FIG. 7 is a schematic structural diagram of a chip according to an implementation of the present disclosure. The chip 500 shown in FIG. 7 includes a processor 510. The processor 510 may invoke a computer program from a memory and run the computer program, to implement the method in the implementations of the present disclosure.

Optionally, as shown in FIG. 7, the chip 500 may further include a memory 520. The processor 510 may invoke the computer program from the memory 520 and run the computer program, to implement the method in the implementations of the present disclosure.

The memory 520 may be an individual component independent of the processor 510, or may be integrated into the processor 510.

Optionally, the chip 500 may further include an input interface 530. The processor 510 may control the input interface 530 to communicate with another device or chip, and specifically, may obtain information or data sent by another device or chip.

Optionally, the chip 500 may further include an output interface 540. The processor 510 may control the output interface 540 to communicate with another device or chip, and specifically, may output information or data to another device or chip.

Optionally, the chip may be applied to a first communications device in the implementations of the present disclosure, and the chip can implement corresponding procedures implemented by the first device in various methods in the implementations of the present disclosure. For brevity, details are not described herein again.

Optionally, the chip may be applied to a second communications device in the implementations of the present disclosure, and the chip can implement corresponding procedures implemented by the second device in various methods in the implementations of the present disclosure. For brevity, details are not described herein again.

It should be understood that, the chip mentioned in the implementations of the present disclosure may be further referred to as a system-level chip, a system chip, a chip system, a system on chip, or the like.

It should be understood that, the processor of this implementation of the present disclosure may be an integrated circuit chip, and has a signal processing capability. During implementation, the steps of the foregoing method implementation may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component. The processor may implement or perform the methods, the steps, and logical block diagrams that are disclosed in the implementations of the present disclosure. The general-purpose processor may be a microprocessor, or the processor may be any conventional processor or the like. Steps of the methods disclosed with reference to the implementations of the present disclosure may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can be understood that, the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be understood that, the memory is an example but is not intended for limitation. For example, the memory in the implementations of the present disclosure may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is, the memory in this implementation of the present disclosure aims to include but is not limited to these memories and any other suitable type of memory.

Figure 8:
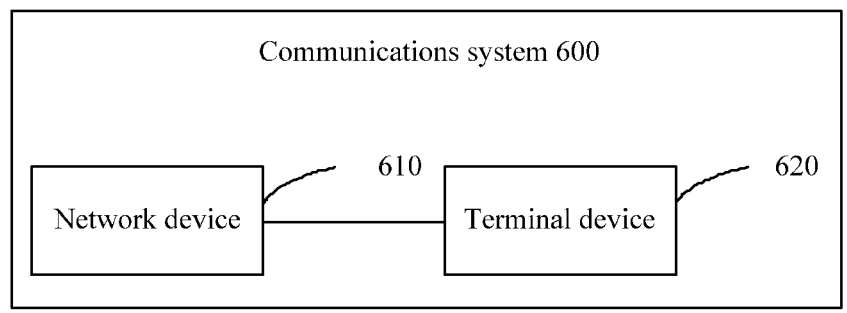
FIG. 8 is a schematic diagram of a communications system according to an implementation of the present disclosure.

FIG. 8 is a schematic block diagram of a communications system 600 according to an implementation of the present disclosure. As shown in FIG. 8, the communications system 600 includes a network device 610 and a terminal device 620.

The network device 610 may be configured to implement corresponding functions implemented by a network device in the foregoing method, and the terminal device 620 may be configured to implement corresponding functions implemented by a terminal device in the foregoing method. For brevity, details are not described herein again.

An implementation of the present disclosure further provides a computer-readable storage medium, configured to store a computer programs.

Optionally, the computer-readable storage medium may be applied to the first device in the implementations of the present disclosure, and the computer program causes a computer to perform corresponding procedures implemented by the first device in various methods in the implementations of the present disclosure. For brevity, details are not described herein again.

Optionally, the computer-readable storage medium may be applied to the second device in the implementations of the present disclosure, and the computer program causes a computer to perform corresponding procedures implemented by the second device in various methods in the implementations of the present disclosure. For brevity, details are not described herein again.

An implementation of the present disclosure further provides a computer program product, including a computer program instruction.

Optionally, the computer program product may be applied to the first device in the implementations of the present disclosure, and the computer program instruction causes a computer to perform corresponding procedures implemented by the first device in various methods in the implementations of the present disclosure. For brevity, details are not described herein again.

Optionally, the computer program product may be applied to the second device in the implementations of the present disclosure, and the computer program instruction causes a computer to perform corresponding procedures implemented by the second device in various methods in the implementations of the present disclosure. For brevity, details are not described herein again.

An implementation of the present disclosure further provides a computer program.

Optionally, the computer program may be applied to the first device in the implementations of the present disclosure, and when run on a computer, the computer program causes the computer to perform corresponding procedures implemented by the first device in various methods in the implementations of the present disclosure. For brevity, details are not described herein again.

Optionally, the computer program may be applied to the second device in the implementations of the present disclosure, and when run on a computer, the computer program causes the computer to perform corresponding procedures implemented by the second device in various methods in the implementations of the present disclosure. For brevity, details are not described herein again.

A person of ordinary skill in the art may notice that the exemplary units and algorithm steps described with reference to the implementations disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding processes in the foregoing method implementations, and details are not described herein again.

In the several implementations provided in the present disclosure, it should be understood that the disclosed system, apparatus, and method may be implemented in other manners. For example, the described apparatus implementation is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the implementations.

In addition, functional units in the implementations of the present disclosure may be integrated into one processing unit, or each of the units may exist alone physically, or two or more units are integrated into one unit.

If implemented in the form of software functional units and sold or used as an independent product, the functions may be stored in a computer-readable storage medium. Based on such an understanding, the technical solutions of the present disclosure essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the method described in the implementations of the present disclosure. The foregoing storage medium includes: any medium that can store program codes, such as a USB flash disk, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A wireless communications method, comprising:
    determining a second slot according to a time domain location of a last one of a plurality of consecutive first slots used to transmit a transport block (TB) repeatedly for a plurality of times; and
    transmitting feedback information by using the second slot determined according to the time domain location of the last one of the first slots, wherein the feedback information is feedback information for the TB transmitted in the first slots,
    wherein the second slot is the $((n+k)2^a/2^b)^{th}$ slot, k and n are positive integers, a represents a subcarrier spacing of a second slot, b represents a subcarrier spacing of a first slot; the n is the time domain position of the last one of the plurality of consecutive first slots, and the a and the b are same.

2. The method according to claim 1, wherein the feedback information comprises an acknowledgement (ACK)/negative acknowledgement (NACK), and the ACK/NACK corresponds to the TB transmitted repeatedly for a plurality of times; or
    the feedback information comprises a plurality of ACKs/NACKs, and the plurality of ACKs/NACKs correspond one-to-one with a plurality of code block groups (CBG) of the TB.

3. The method according to claim 1, wherein the method is performed by a terminal device, and k is preset in the terminal device based on a protocol, or configured for the terminal device through a higher-layer parameter of a network side, or indicated to the terminal device by a network side through downlink control information (DCI).

4. The method according to claim 1, wherein the TB is uplink TB;
    or the TB is downlink TB.

5. A communications device, comprising a processor and a transceiver, wherein
    the processor is configured to: determine a second slot according to a time domain location of a last one of a plurality of consecutive first slots used to transmit a transport block (TB) repeatedly for a plurality of times; and
    the transceiver is configured to: transmit feedback information by using the second slot determined according to the time domain location of the last one of the first slots, wherein the feedback information is feedback information for the TB transmitted in the first slots,
    wherein the second slot is the $((n+k)2^a/2^b)^{th}$ slot, k and n are positive integers, a represents a subcarrier spacing of a second slot, b represents a subcarrier spacing of a first slot; the n is the time domain position of the last one of the plurality of consecutive first slots, and the a and the b are same.

6. The communications device according to claim 5, wherein the feedback information comprises an acknowledgement (ACK)/negative acknowledgement (NACK), and the ACK/NACK corresponds to the TB transmitted repeatedly for a plurality of times; or
    the feedback information comprises a plurality of ACKs/NACKs, and the plurality of ACKs/NACKs correspond one-to-one with a plurality of code block groups (CBG) of the TB.

7. The communications device according to claim 5, wherein the communications device is performed by a terminal device, and k is preset in the terminal device based on a protocol, or configured for the terminal device through a higher-layer parameter of a network side, or indicated to the terminal device by a network side through downlink control information (DCI).

8. A communications device, comprising a processor and a memory, wherein the memory is configured to store a computer program, and the processor is configured to invoke and run the computer program stored in the memory, to cause the communications device to perform the method according to claim 1.

9. A chip, comprising: a processor, configured to invoke a computer program from a memory and run the computer program, to cause a device in which the chip is installed to perform the method according to claim 1.

10. A non-transitory computer-readable storage medium, configured to store a computer program, wherein the computer program causes a computer to perform the method according to claim 1.

11. A wireless communications method, comprising:
    transmitting a transport block (TB) repeatedly for a plurality of times in a plurality of consecutive first slots; and
    receiving feedback information in a second slot, wherein the second slot is determined according to a time domain location of a last one of the first slots, wherein the feedback information is feedback information for the TB transmitted in the first slots,
    wherein the second slot is the $((n+k)2^a/2^b)^{th}$ slot, k and n are positive integers, a represents a subcarrier spacing of a second slot, b represents a subcarrier spacing of a first slot, n is the time domain position of the last one of the plurality of consecutive first slots, and the a and the b are same.

12. The method according to claim 11, wherein the feedback information comprises an acknowledgement (ACK)/negative acknowledgement (NACK), and the ACK/NACK corresponds to the TB transmitted repeatedly for a plurality of times; or
the feedback information comprises a plurality of ACKs/NACKs, and the plurality of ACKs/NACKs correspond one-to-one with a plurality of code block groups (CBG) of the TB.

13. A wireless communications device, comprising a processor and a transceiver, wherein
the processor is configured to control the transceiver to transmit a transport block (TB) repeatedly for a plurality of times in a plurality of consecutive first slots; and
receive feedback information in a second slot, wherein the second slot is determined according to a time domain location of a last one of the first slots, wherein the feedback information is feedback information for the TB transmitted in the first slots,
wherein the second slot is the $((n+k)2^a/2^b)^{th}$ slot, k and n are positive integers, a represents a subcarrier spacing of a second slot, b represents a subcarrier spacing of a first slot, n is the time domain position of the last one of the plurality of consecutive first slots, and the a and the b are same.

14. The device according to claim 13, wherein the feedback information comprises an acknowledgement (ACK)/negative acknowledgement (NACK), and the ACK/NACK corresponds to the TB transmitted repeatedly for a plurality of times; or
the feedback information comprises a plurality of ACKs/NACKs, and the plurality of ACKs/NACKs correspond one-to-one with a plurality of code block groups (CBG) of the TB.

* * * * *